(12) United States Patent
Erlenbach et al.

(10) Patent No.: US 10,323,946 B2
(45) Date of Patent: Jun. 18, 2019

(54) AUTOMATIC MODIFICATION OF MONITORING OF VEHICLE DATA

(71) Applicant: Verizon Patent and Licensing Inc., Arlington, VA (US)

(72) Inventors: Kyle Erlenbach, Solon, OH (US); Jennifer Strouth, Seven Hills, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/730,219

(22) Filed: Oct. 11, 2017

(65) Prior Publication Data

US 2019/0107398 A1    Apr. 11, 2019

(51) Int. Cl.
| | |
|---|---|
| *G07C 5/00* | (2006.01) |
| *G07C 3/02* | (2006.01) |
| *B60Q 9/00* | (2006.01) |
| *G06F 17/00* | (2019.01) |
| *G08G 1/14* | (2006.01) |
| *B60W 30/18* | (2012.01) |
| *B60G 17/016* | (2006.01) |
| *G01C 21/26* | (2006.01) |
| *G01C 21/32* | (2006.01) |
| *B60W 40/09* | (2012.01) |
| *H04L 29/08* | (2006.01) |

(52) U.S. Cl.
CPC .............. *G01C 21/26* (2013.01); *B60W 40/09* (2013.01); *G01C 21/32* (2013.01); *H04L 67/12* (2013.01); *B60W 2540/30* (2013.01); *B60W 2550/402* (2013.01)

(58) Field of Classification Search
CPC ..... G01C 21/26; B60G 17/016; B60W 30/08; G07C 5/00; G07C 3/02; G08G 1/14; G06F 17/00; B60Q 9/00
See application file for complete search history.

(56) References Cited

U.S. PATENT DOCUMENTS

| | | | |
|---|---|---|---|
| 2011/0091005 A1* | 4/2011 | Ishikawa .................. | B66F 9/24 377/16 |
| 2014/0067152 A1* | 3/2014 | Swanson ................ | G07C 5/008 701/1 |
| 2015/0161890 A1* | 6/2015 | Huntzicker ............ | G08G 1/144 340/932.2 |
| 2015/0279125 A1* | 10/2015 | Chronowski .......... | G07C 5/008 701/29.2 |
| 2016/0023599 A1* | 1/2016 | Jo .......................... | G08G 1/161 340/903 |
| 2017/0136842 A1* | 5/2017 | Anderson ............ | B60G 17/016 |
| 2017/0247028 A1* | 8/2017 | Goudy ................... | B60Q 9/008 |

* cited by examiner

*Primary Examiner* — Yuri Kan

(57) ABSTRACT

A device can receive an indication to cause a vehicle to provide data at a updated rate. The device can determine the updated rate at which the vehicle is to provide the data. The updated rate can include at least one of a frequency at which the data is to be provided, or an amount of time for which the data is to be provided. The device can determine a set of instructions to be provided to the vehicle based on the indication. The device can provide the set of instructions to the vehicle to cause the vehicle to provide the data at the updated rate. The device can receive the data from the vehicle to permit or cause an action to be performed with respect to the data or the vehicle. The device can cause the action to be performed with respect to the data or the vehicle.

20 Claims, 5 Drawing Sheets

AUTOMATIC MODIFICATION OF MONITORING OF VEHICLE DATA

BACKGROUND

An automotive navigation system can include a satellite navigation device, such as a global positioning system (GPS) device. A vehicle can use the automotive navigation system to determine a position of the vehicle. The vehicle and/or system can provide data associated with the position of the vehicle to another system or device that monitors the position of the vehicle.

DETAILED DESCRIPTION OF PREFERRED EMBODIMENTS

The following detailed description of example implementations refers to the accompanying drawings. The same reference numbers in different drawings can identify the same or similar elements.

A vehicle, such as a delivery vehicle associated with an organization, can provide data, such as global positioning system (GPS) data, to another device at a particular rate. In some cases, the rate at which the vehicle provides the data does not permit the other device to accurately monitor movement of the vehicle and/or accurately perform other actions related to the vehicle. In addition, the vehicle can lack a capability to dynamically adjust the rate at which the vehicle provides the data to the other device, thereby preventing dynamic monitoring of the vehicle in different scenarios, consuming processing resources when the vehicle provides the data at a higher rate than needed, and/or the like.

Some implementations, described herein, provide a device (e.g., a server device) that is capable of dynamically adjusting a rate at which a vehicle (e.g., a navigation system associated with the vehicle) provides data to the device. In this way, the device can dynamically adjust a rate at which the vehicle provides data in different scenarios, based on changes to information related to the vehicle, and/or the like. This permits the device to control the rate at which the vehicle provides data to permit more accurate monitoring of the vehicle (e.g., by increasing a rate at which the vehicle provides the data), to conserve processing resources of the vehicle (e.g., by reducing a rate at which the vehicle provides the data), and/or the like.

Figure 1:
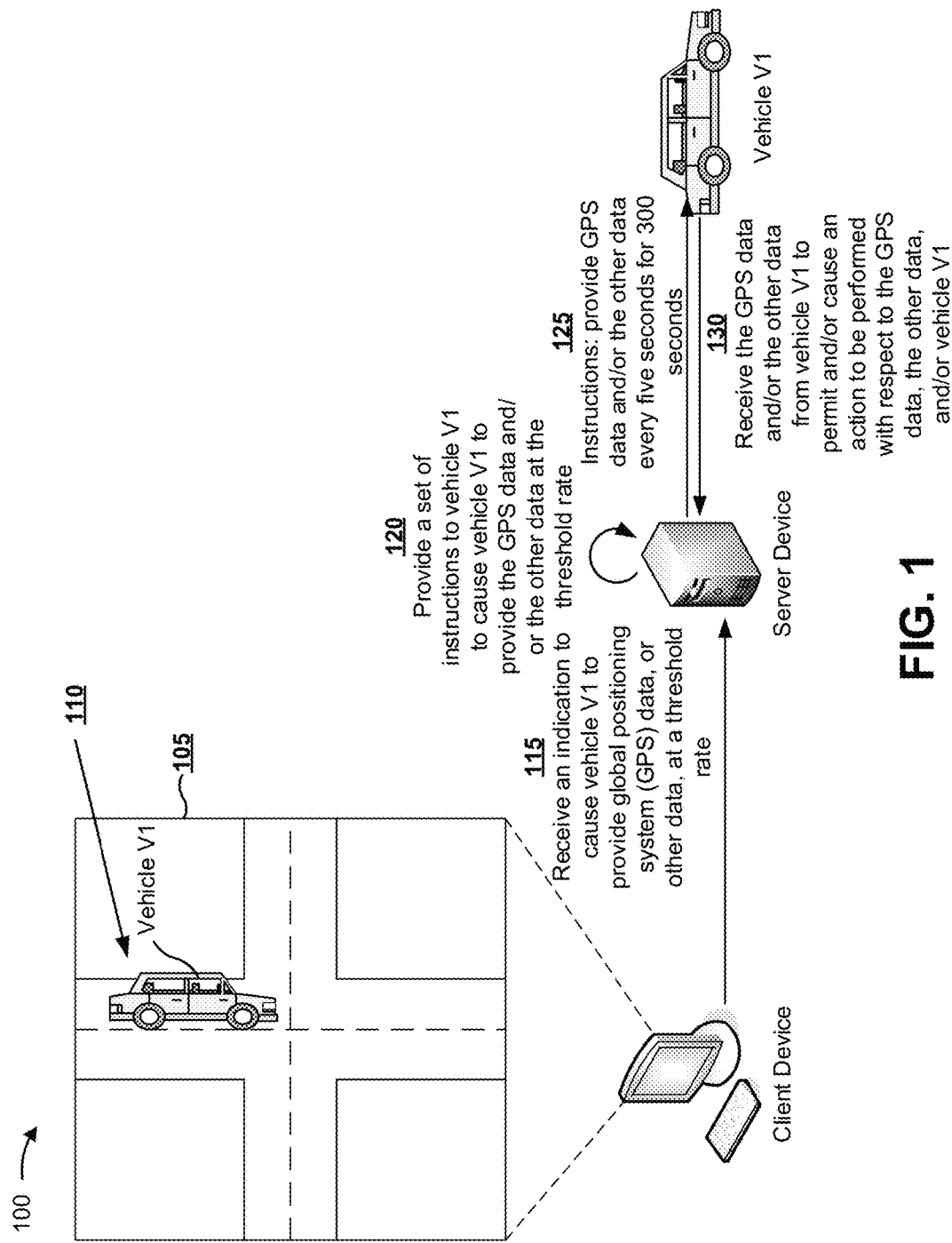
FIG. 1 is a diagram of an overview of an example implementation described herein.

FIG. 1 is a diagram of an overview of an example implementation 100 described herein. As shown in FIG. 1, example implementation 100 can include a client device (e.g., associated with remotely monitoring a vehicle), a server device, and vehicle V1 (e.g., that includes a navigation system, a GPS, a diagnostic system, and/or the like that can provide data related to vehicle V1). The server device can receive data from the client device and vehicle V1, and/or send data to the client device and/or vehicle V1. Although FIG. 1 shows a single client device, a single server device, and a single vehicle, in practice, there can be hundreds, thousands, millions, etc. of client devices, server devices, and/or vehicles. In this way, example implementation 100 can include a set of devices that cannot be managed manually or objectively by a human actor.

As shown by reference number 105, the client device can provide a map for display. The map can display information identifying vehicles that client device is monitoring (e.g., delivery vehicles that a client device associated with a dispatcher of a delivery organization is monitoring). For example, as further shown by reference number 105, the client device can provide an indicator (e.g., an icon) for vehicle V1 for display (e.g., on or with the map) that indicates a location of vehicle V1 on a road. As shown by reference number 110, a user of the client device can interact with the map to select the indicator for vehicle V1 (e.g., by touching a screen of the client device to select the indicator representing vehicle V1). User selection of the indicator identifying vehicle V1, can indicate that the user wants to more accurately monitor vehicle V1 (e.g., by receiving data from vehicle V1 more frequently relative to a default monitoring).

As shown by reference number 115, the server device can receive an indication to cause vehicle V1 to provide global positioning system (GPS) data, which relates to a position of vehicle V1, at a threshold rate (e.g., at an updated rate that is different that a current rate at which data is being received). The server device can receive the indication based on the user of the client device selecting the indicator for vehicle V1 displayed on the map. For example, the selection can indicate that the server device is to cause vehicle V1 to provide GPS data at a threshold rate. Additionally, or alternatively, selection of the indicator, or other actions or information provided by the client device, can indicate that the server device is to cause vehicle V1 to provide other types of data at the same or other threshold rates, such as telemetry data, diagnostic data, data associated with a user of vehicle V1, and/or the like.

In some implementations, the server device can determine the threshold rate at which the vehicle is to provide the GPS data based on information identifying a driver of vehicle V1, a location of vehicle V1, a time of day, a threshold quantity of years of driving experience of a driver of vehicle V1, information identifying a use of the GPS data, or other types of data to be received (e.g., a tracking use, an analytics use, a reporting use, etc.), and/or the like. Additionally, or alternatively, the server device can determine the threshold rate based on information identifying prior threshold rates at which data was previously provided by vehicle V1, information related to the driver and/or vehicle V1 (e.g., an incident history of the driver and/or vehicle V1, a threshold age of the driver and/or vehicle V1, a type of road on which vehicle V1 is travelling, current or forecasted weather information in or around the vicinity of vehicle V1 or in a direction of travel of vehicle V1, an amount of time that vehicle V1 has been travelling without stopping for more than threshold amount of time, etc.), a use of vehicle V1 (e.g., commercial, personal, hazardous material transportation, etc.), and/or the like. For example, the server device can use machine learning and/or artificial intelligence to determine the threshold rate based on combinations of previously described metrics and/or factors, such as to determine an optimal threshold rate, a threshold rate requested for other vehicles associated with similar information, and/or the like.

As shown by reference number 120, the server device can provide a set of instructions to vehicle V1 to cause vehicle V1 to provide the GPS data and/or the other data at the threshold rate. For example, the server device can provide the set of instructions to a client device, a navigation system, a telemetry system, a diagnostic system, and/or the like associated with vehicle V1. In some cases, vehicle V1 can provide the GPS data and/or other data without receiving a set of instructions from the server device (e.g., based on determining that one of the above described metrics and/or factors is satisfied, based on detecting a problem with operation of vehicle V1, and/or the like).

As shown by reference number 125, the server device can provide a set of instructions to provide GPS data and/or other data every five seconds for 300 seconds, every three seconds for 60 seconds, or another interval for another amount of time. For example, the instructions can indicate that vehicle V1 is to provide the GPS data and/or the other data at a rate of every five seconds for a duration of 300 seconds. The server device can provide the set of instructions to a device in vehicle V1 (e.g., mounted in vehicle V1, within communicative proximity of a sensor associated with vehicle V1, etc.). In addition, the server device can determine to not provide a set of instructions to vehicle V1 based on, for example, a setting associated with an account associated with the client device or vehicle V1, such as a daily limit on a quantity of sets of instructions that can be provided to vehicle V1.

As shown by reference number 130, the server device can receive the GPS data and/or the other data from vehicle V1 (e.g., at the threshold rate) to permit and/or cause an action to be performed with respect to the GPS data, the other data, and/or vehicle V1. In some implementations, the server device can receive thousands, millions, billions, etc. of data elements when receiving the GPS data and/or the other data from vehicle V1. In this way, the server device can receive a data set that cannot be processed manually or objectively by a human actor.

In some implementations, the server device can process the GPS data and/or the other data to permit and/or cause an action to be performed. For example, the server device can generate a report related to the GPS data and/or the other data, determine, and/or provide, a set of directions for vehicle V1 if the server device determines that vehicle V1 has deviated from a planned route based on the GPS data and/or the other data, and/or the like. In some implementations, when data received from vehicle V1 includes diagnostic information related to an operation of vehicle V1, the server device can diagnose a problem with the operation of vehicle V1, schedule vehicle V1 for maintenance, and/or the like.

In this way, a device (e.g., a server device) can dynamically adjust a rate at which a vehicle provides data in different scenarios. This permits the device to control the rate at which the vehicle provides data to permit more accurate monitoring of the vehicle (e.g., by increasing a rate at which the vehicle provides the data), to conserve processing resources of the vehicle (e.g., by reducing a rate at which the vehicle provides the data), and/or the like.

As indicated above, FIG. 1 is provided merely as an example. Other examples are possible and can differ from what was described with regard to FIG. 1. Although some implementations were described with respect to GPS data, the implementations described herein apply equally to other types of data, such as telemetry data, diagnostic data, data related to a user of a vehicle, and/or the like.

Figure 2:
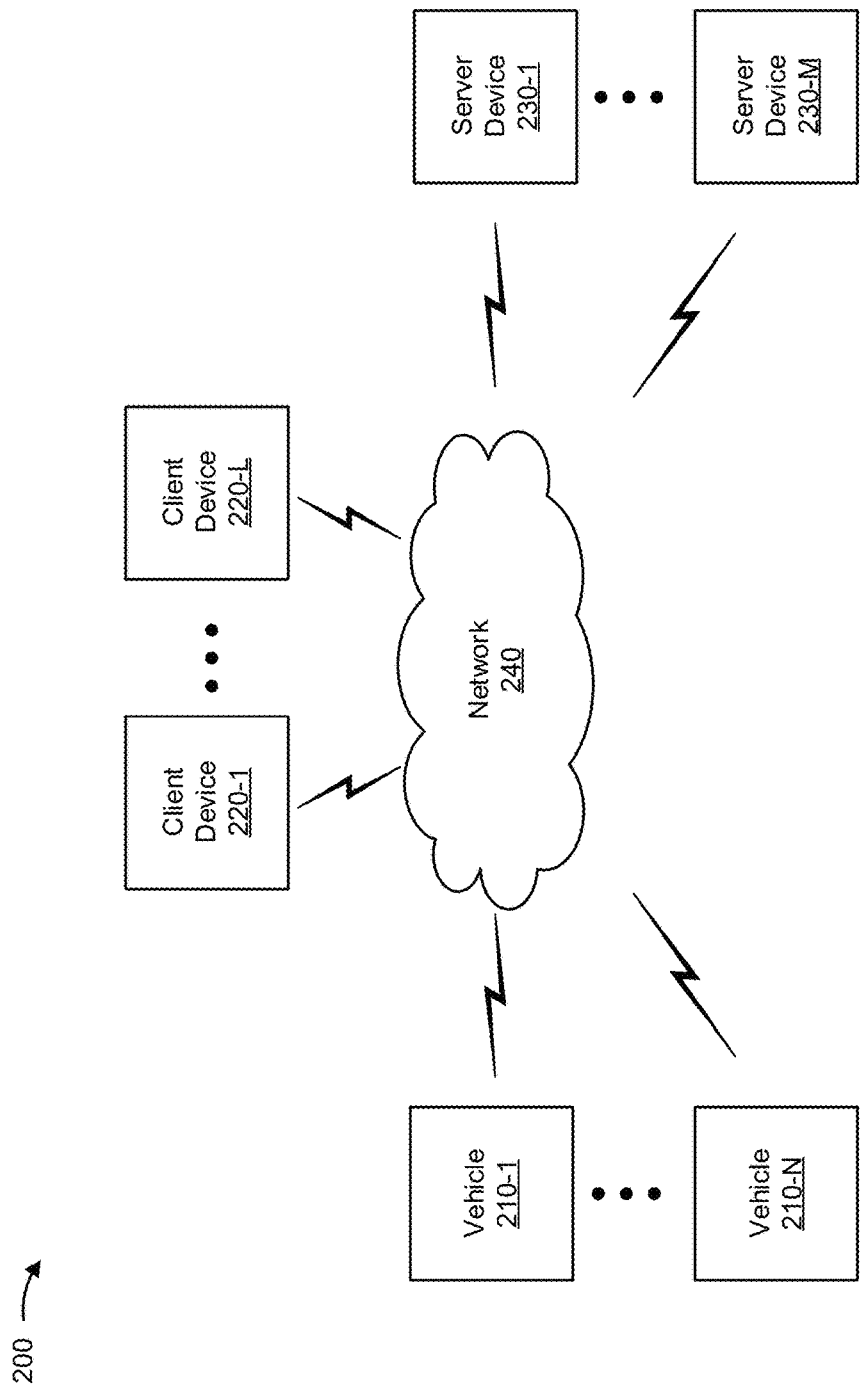
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more vehicles 210-1 through 210-N (N≥1) (hereinafter referred to collectively as "vehicles 210," and individually as "vehicle 210"), one or more client devices 220-1 through 220-L (L≥1) (hereinafter referred to collectively as "client devices 220," and individually as "client device 220"), one or more server devices 230-1 through 230-M (M≥1) (hereinafter referred to collectively as "server devices 230," and individually as "server device 230"), and a network 240. Devices of environment 200 can interconnect via wired connections, wireless connections, or a combination of wired and wireless connections.

Vehicle 210 includes a mobile machine (e.g., that transports people and/or cargo). For example, a vehicle can include a motor vehicle (e.g., a motorcycle, a bus, a car, etc.), a railed vehicle (e.g., a train or a tram), a watercraft (e.g., a ship, a boat, a submarine, etc.), an aircraft (e.g., a plane, a glider, or an unmanned aerial vehicle (UAV)), a spacecraft, an electric vehicle (e.g., an electric car), a moped, a scooter, a bicycle, and/or the like. In some implementations, a vehicle can include an autonomous vehicle, such as an autonomous car, an autonomous boat, and/or the like. In some implementations, vehicle 210 can provide data to server device 230 (e.g., at a threshold rate), as described elsewhere herein. In some implementations, vehicle 210 can include a system (e.g., a GPS system, a telemetry system, a diagnostic system, etc.), client device 220, and/or the like that provides data associated with vehicle 210 to server device 230, as described elsewhere herein. In practice, there can be thousands, millions, billions, etc. of vehicles 210 in communication with client device 220 and/or server device 230.

Client device 220 includes one or more devices capable of receiving, generating, storing, processing, and/or providing information associated with vehicle 210. For example, client device 220 can include a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), or a similar type of device. In some implementations, client device 220 can provide an indication to server device 230 to cause server device 230 to modify a rate at which vehicle 210 provides data, as described elsewhere herein. Additionally, or alternatively, client device 220 can receive data from vehicle 210 and/or a report related to the data from server device 230, as described elsewhere herein. In practice there can be thousands, millions, billions, etc. of client devices 220 in communication with vehicle 210 and/or server device 230.

Server device 230 includes one or more devices capable of receiving, storing, providing, generating, and/or processing information associated with vehicle 210. For example, server device 230 can include a server (e.g., a multi-server micro data center), a workstation computer, a virtual machine (VM) provided in a cloud computing environment, or a similar type of device. In some implementations, server device 230 can cause vehicle 210 to provide data at a threshold rate (e.g., by providing a set of instructions to vehicle 210), as described elsewhere herein. Additionally, or alternatively, server device 230 can process the data received from vehicle 210 (e.g., to generate a report related to the data), as described elsewhere herein. In practice there can be thousands, millions, billions, etc. of server devices 230 in communication with vehicle 210 and/or client device 220.

Network 240 includes one or more wired and/or wireless networks. For example, network 240 can include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
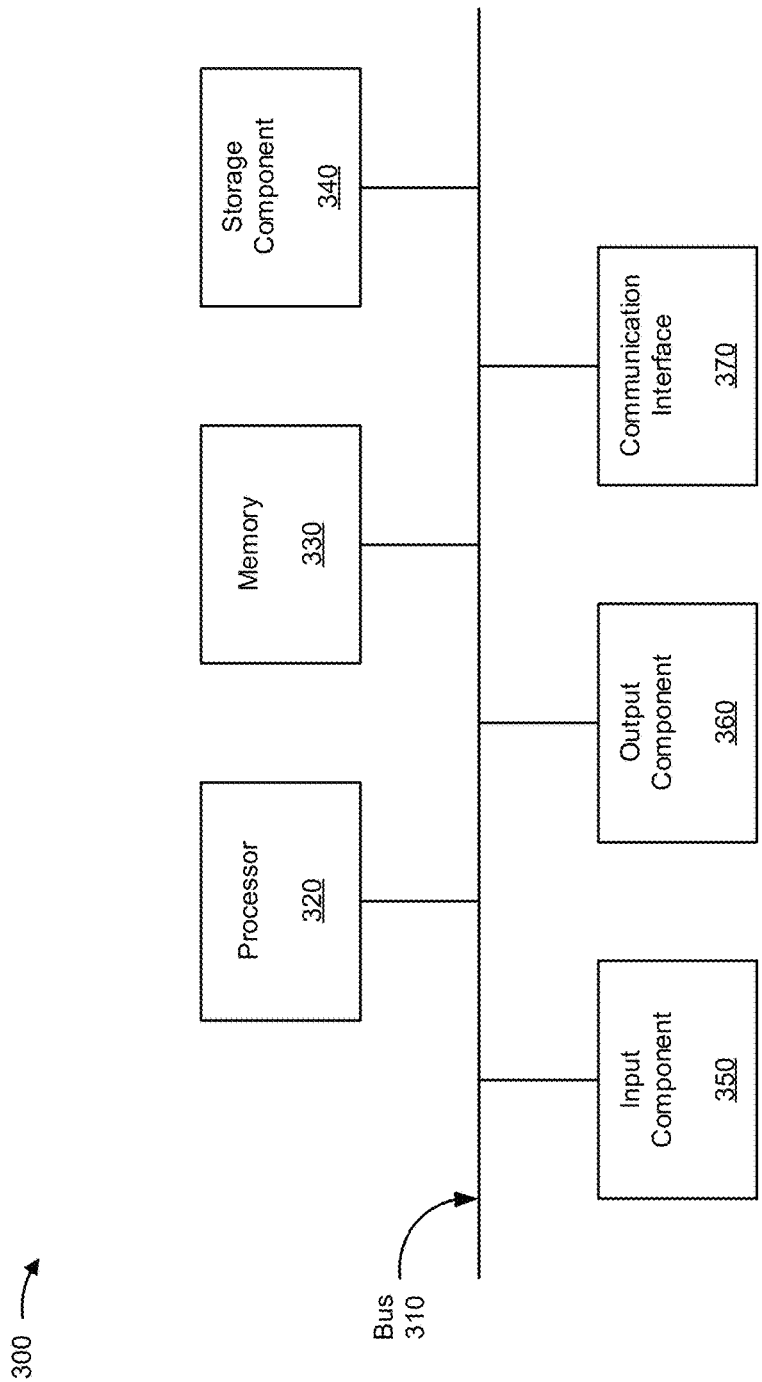
FIG. 3 is a diagram of example components of one or more devices of FIG. 2.

FIG. 3 is a diagram of example components of a device 300. Device 300 can correspond to vehicle 210 (or a device associated with vehicle 210), client device 220, and/or server device 230. In some implementations, vehicle 210 (or a device associated with vehicle 210), client device 220, and/or server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
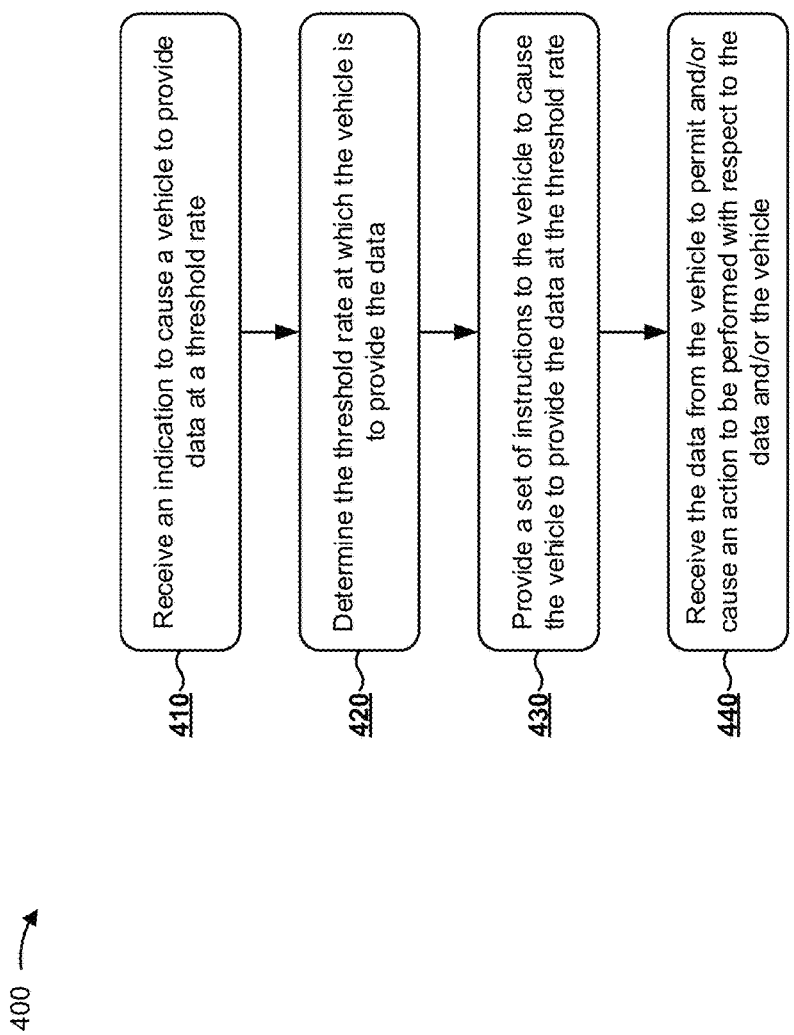
FIG. 4 is a flow chart of an example process for automatic modification of monitoring of vehicle data.

FIG. 4 is a flow chart of an example process 400 for automatic modification of monitoring of vehicle data. In some implementations, one or more process blocks of FIG. 4 can be performed by server device 230. In some implementations, one or more process blocks of FIG. 4 can be performed by another device or a group of devices separate from or including server device 230, such as vehicle 210 and/or client device 220.

As shown in FIG. 4, process 400 can include receiving an indication to cause a vehicle to provide data at a threshold rate (block 410) and determining the threshold rate at which the vehicle is to provide the data (block 420). For example, server device 230 can receive an indication to cause a vehicle to provide data at a threshold rate and/or can determine the threshold rate at which the vehicle is to provide the data. In some implementations, server device 230 can receive the indication periodically, according to a schedule, based on input from a user of client device 220 and/or a device associated with vehicle 210, and/or the like. In some implementations, server device 230 can receive thousands, millions, billions, etc. of indications. In this way, server device 230 can receive a set of indications that cannot be processed manually or objectively by a human actor.

In some implementations, the data can include GPS data, data related to a performance of vehicle 210, such as mileage, fuel level, tire pressure, speed of travel, engine performance metrics (e.g., revolutions per minute, power output, etc.), data related to cargo of vehicle 210, and/or the like. Additionally, or alternatively, the data can include data related to an environment in which vehicle 210 is traveling, such as data that identifies weather conditions at a location of vehicle 210, weather conditions in a direction of travel of vehicle 210, a road type and/or road conditions of a road on which vehicle 210 is traveling (e.g., when vehicle 210 is a motor vehicle), a road type and/or road conditions of a road on which vehicle 210 is predicted to be traveling (e.g., when vehicle 210 is a motor vehicle) wind speed (e.g., when vehicle 210 is an aircraft), wave height and/or period (e.g., when vehicle 210 is a water craft), and/or the like.

In some implementations, server device 230 can receive an indication based on a user of client device 220 selecting an indicator (e.g., an icon) that identifies a particular vehicle 210 provided for display on a map via client device 220. Additionally, or alternatively, server device 230 can receive an indication based on a selection by a user of a device (e.g., a navigation system, a telemetry system, etc.) associated with vehicle 210 (e.g., when a user is lost, when a user is experiencing an emergency, etc.), and/or the like.

In some implementations, server device 230 can receive an indication based on server device 230 determining that a threshold metric and/or factor is satisfied. For example, a metric and/or factor can include an identity of a driver of vehicle 210, a location of vehicle 210, a time of day, a quantity of years of driving experience of a driver of vehicle 210, and/or the like. In some implementations, server device 230 can receive an indication based on information related to the driver and/or vehicle 210 (e.g., an incident history, an age of a driver and/or vehicle 210, a type of road on which vehicle 210 is travelling, etc.), a use of vehicle 210 (e.g., commercial use, personal use, hazardous material transportation, etc.), and/or the like. For example, server device 230 can determine information related to vehicle 210, a driver of vehicle 210, a use of vehicle 210, etc. based on information associated with vehicle 210, can receive the aforementioned information from client device 220 and/or vehicle 210, and/or the like and can receive an indication based on determining and/or receiving the information.

In some implementations, providing data at a threshold rate can include a threshold interval or frequency at which vehicle 210 is to provide the data and/or a threshold amount of time for which vehicle 210 is to provide the data. For example, server device 230 can receive information identifying the threshold rate when server device 230 receives the indication to cause vehicle 210 to provide data at a threshold rate (e.g., based on a user of client device 220 inputting information that identifies the threshold rate).

In some implementations, server device 230 can determine the threshold rate. For example, server device 230 can determine the threshold rate based on a type of indication that server device 230 receives (e.g., an indication that a user of vehicle 210 is lost, an emergency indication from a user of vehicle 210, etc.). Additionally, or alternatively, server device 230 can determine the threshold rate based on a type of threshold metric and/or factor satisfied and/or combinations of threshold metrics and/or factors satisfied (e.g., a threshold quantity of traffic incidents associated with vehicle 210, a driver of vehicle 210 having a threshold quantity of years of driving experience, a threshold quantity of sudden changes in acceleration, etc.), and/or the like. For example, server device 230 can determine that a driver of vehicle 210 has a threshold quantity of years of driving experience and can determine the threshold rate based on the driver of vehicle 210 having the threshold quantity of years of driving experience. Additionally, or alternatively, and as another example, a threshold quantity of sudden changes in acceleration can indicate that a driver of vehicle 205 is distracted, is intoxicated, is tired, is texting, and/or the like.

In some implementations, server device 230 can determine the threshold rate using machine learning. For example, server device 230 can determine the threshold rate based on different rates associated with different users of vehicle 205 (e.g., as provided by other users of other client devices 220, based on historical input indicating threshold rates, based on a type of data being requested, etc.). In some implementations, server device 230 can use machine learning to identify types of indications, metrics, factors, etc. that are indicative of a threshold rate. For example, server device 230 can determine a threshold rate based on whether those types of indications are received, based on whether particular threshold metrics and/or factors are satisfied, and/or the like.

In some implementations, server device 230 can determine the threshold rate based on determining a score. For example, server device 230 can determine a score based on a type of data being requested, factors that are satisfied, threshold metrics that are satisfied, a type of indication received, and/or the like. Continuing with the previous example, server device 230 can determine the threshold rate based on the score satisfying a threshold.

In some implementations, server device 230 can determine a threshold rate that is a faster rate than a current rate at which vehicle 210 is providing data. For example, when vehicle 210 is a motor vehicle in a city (e.g., as indicated by GPS data), server device 230 can determine to increase the rate at which the data is provided. In this way, server device 230 improves monitoring of vehicle 210 by causing vehicle 210 to provide more accurate data, data that is closer to real-time data (e.g., relative to a slower rate of data), and/or the like.

In some implementations, server device 230 can determine a threshold rate that is a slower rate than a current rate at which vehicle 210 is providing data. For example, when vehicle 210 is an aircraft at cruising altitude, server device 230 can determine a slower rate than during landing or take off (e.g., based on a reduced need for more accurate GPS data relative to landing or takeoff). In this way, server device 230 conserves processing resources of vehicle 210 by reducing a rate at which vehicle 210 provides data.

In some implementations, server device 230 can determine a type of information to be provided. For example, server device 230 can determine a type of information based on input from a user of client device 220, based on a type of indication received (e.g., an emergency indication that indicates vehicle 210 is experiencing an emergency, a lost indication indicating that vehicle 210 is lost or has deviated from a planned route, a tracking indication indicating that a user of client device 220 wants to track movement of vehicle 210 more accurately relative to a default level of tracking, a performance indication indicating that vehicle 210 is experience a performance problem, etc.), and/or the like.

In this way, server device 230 can receive an indication to cause vehicle 210 to provide data at a threshold rate and/or to determine the threshold rate at which vehicle 210 is to provide the data, to cause server device 230 to provide a set of instructions to vehicle 210 to cause vehicle 210 to provide the data at the threshold rate.

As further shown in FIG. 4, process 400 can include providing a set of instructions to the vehicle to cause the vehicle to provide the data at the threshold rate (block 430). For example, server device 230 can provide a set of instructions to vehicle 210 to cause vehicle 210 to provide the data at the threshold rate. In some implementations, server device 230 can provide a set of instructions after receiving an indication to provide a set of instructions, periodically, according to a schedule, and/or the like. In some implementations, server device 230 can provide hundreds, thousands, millions, etc. of sets of instructions to hundreds, thousands, millions, etc. of vehicles 210.

In some implementations, the set of instructions can cause vehicle 210 to provide data at a threshold rate. For example, the set of instructions can cause vehicle 210 to provide data at a particular frequency for a threshold amount of time. In some implementations, server device 230 can provide the set of instructions to a device associated with vehicle 210. For example, server device 230 can provide the set of instructions to client device 220, a navigation system, a telemetry device, a diagnostic device, and/or the like associated with vehicle 210. This permits server device 230 to receive data associated with vehicle 210 when vehicle 210 would otherwise not be capable of providing the data.

In some implementations, server device 230 can provide a set of instructions to client device 220 associated with vehicle 205 (e.g., a client device 220 associated with an occupant of vehicle 210 as determined by information provided to server device 230 that indicates a user of client device 220 is an occupant of vehicle 210, such as a passenger manifest). For example, the set of instructions can cause client device 220 to gather information related to vehicle 210 (e.g., a speed of vehicle 210, a direction of travel of vehicle 210, etc.) and can cause client device 220 to provide the information to server device 230 at a threshold rate.

In some implementations, client device 220 can gather information related to vehicle 210 and provide the information to server device 230 at different rates. For example, client device 220 associated with vehicle 210 can gather information related to vehicle 210 at a first threshold rate and can provide the information to server device 230 at a second threshold rate. Continuing with the previous example, client device 220 can gather information to be provided to server device 230 and can provide the information to server device 230 at a slower or faster threshold rate relative to a threshold rate at which client device 220 gathered the data, can store the information and provide the information to server device 230 at a later time (e.g., when client device 220 has cell coverage, when client device 220 is connected to Wi-Fi, when client device 220 has a threshold amount of data remaining for a data plan associated with an account of client device 220, etc.), and/or the like.

In some implementations, server device 230 can determine or generate a set of instructions prior to providing the set of instructions to vehicle 210. For example, server device 230 can generate a set of instructions that identifies the data vehicle 210 is to provide, a threshold rate at which vehicle 210 is to provide the data, an amount of time for which vehicle 210 is to provide the data, and/or the like.

In some implementations, vehicle 210 can provide the data after receiving the set of instructions. For example, vehicle 210 can receive the set of instructions from server device 230, can process the set of instructions to determine the data vehicle 210 is to provide, a threshold rate at which vehicle 210 is to provide the data, an amount time for which vehicle 210 is to provide the data, and/or the like, and can provide the data according to the set of instructions after processing the data. Conversely, vehicle 210 can provide the data without receiving the set of instructions. For example, vehicle 210 can provide the data based on detecting a threshold metric and/or a factor being satisfied, detecting an issue with operation of vehicle 210, receiving an indication from a user of a device associated with vehicle 210 to provide the data, and/or the like.

In this way, server device 230 can provide a set of instructions to vehicle 210 to cause vehicle 210 to provide the data at the threshold rate, to cause server device 230 to receive the data at the threshold rate.

As further shown in FIG. 4, process 400 can include receiving the data from the vehicle to permit and/or cause an action to be performed with respect to the data and/or the vehicle (block 440). For example, server device 230 can receive the data from vehicle 210 to permit and/or cause an action to be performed with respect to the data and/or vehicle 210. In some implementations, server device 230 can receive thousands, millions, billions, etc. of data elements when receiving the data. In this way, server device 230 can receive a data set that cannot be processed manually or objectively by a human actor.

In some implementations, server device 230 can perform an analysis using the data. For example, server device 230 can identify a source of a performance issue related to vehicle 210 and/or can schedule maintenance for vehicle 210 after identifying a source of the performance issue. Additionally, or alternatively, and as another example, server device 230 can compare data to other vehicles 210 (e.g., to determine if vehicle 210 is operating in a manner similar to other vehicles 210). Additionally, or alternatively, and as another example, server device 230 can aggregate data from vehicle 210 with other vehicles 210, and can perform analytics on the aggregated data (e.g., to analyze a performance of a fleet of vehicles 210, to perform machine learning using data from multiple vehicles 210, etc.). Additionally, or alternatively, and as another example, server device 230 can store the data, such as to permit a mechanic or technician to analyze the data at a later time. Additionally, or alternatively, and as another example, server device 230 can generate a report that includes the data, information identifying a result of performing an analysis of the data, and/or the like. In some implementations, server device 230 can cause the report, or other information, to be provided for display via client device 220.

Additionally, or alternatively, and as another example, server device 230 can send a message (e.g., to client device 220) that includes information identifying the data, a result of an analysis, and/or the like. Additionally, or alternatively, and as another example, server device 230 can schedule a meeting (e.g., among managers of an organization), to discuss the data, a result of an analysis of the data, and/or the like (e.g., by using electronic calendars to identify an available meeting time and/or generating a calendar item for the meeting).

Additionally, or alternatively, server device 230 can provide data for display (e.g., via client device 220). For example, server device 230 can provide the data for display on a map (e.g., in association with an indicator identifying vehicle 210), thereby permitting a user of client device 220 to monitor vehicle 210. Additionally, or alternatively, server device 230 can determine and/or provide a set of directions to vehicle 210 (e.g., when server device 230 determines that vehicle 210 has deviated from a planned route). Additionally, or alternatively, server device 230 can send a message to dispatch law enforcement, emergency personnel, a mechanic, etc. to vehicle 210.

Additionally, or alternatively, server device 230 can cause an autonomous vehicle 210 (e.g., an autonomous car, an autonomous boat, an autonomous plane, etc.) to perform other actions. For example, server device 230 can cause an autonomous vehicle 210 to change direction, to stop, to slow down, to speed up, to drop an anchor (e.g., when vehicle 210 is a boat), to change altitude (e.g., when vehicle 210 is a plane), to unload another vehicle 210 (e.g., when vehicle 210 is a crane, a fork lift, etc.), and/or the like.

In this way, server device 230 can receive the data from vehicle 210 to permit and/or cause an action to be performed with respect to the data and/or vehicle 210.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
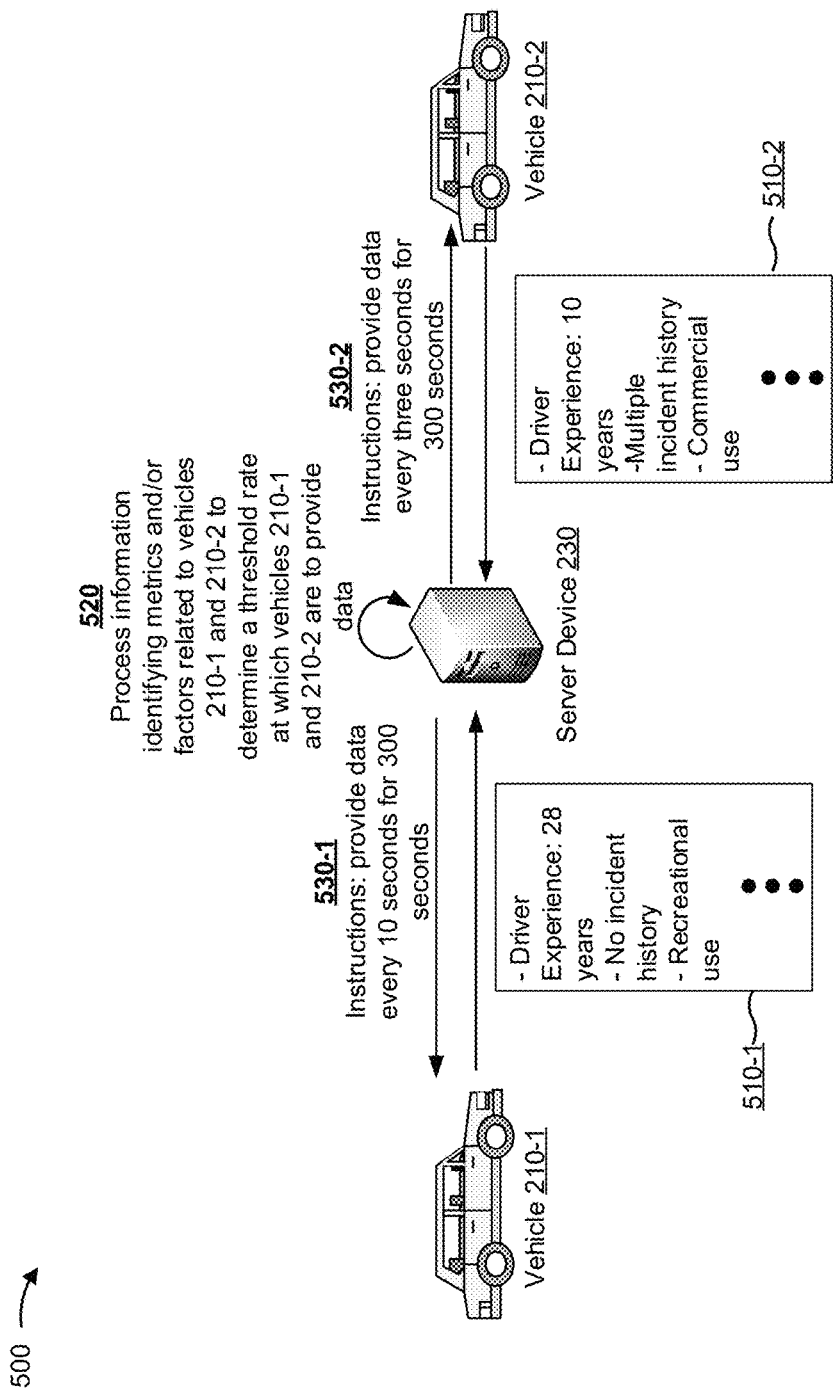
FIG. 5 is a diagram of an example implementation described herein.

FIG. 5 is diagram of an example implementation 500 relating to example process 400 shown in FIG. 4. FIG. 5 shows an example of server device 230 determining threshold rates for various vehicles 210 based on threshold metrics and/or factors associated with the various vehicles 210.

As shown by reference numbers 510-1 and 510-2, server device 230 can receive information from vehicles 210-1 and 210-2. For example, and as shown by reference number 510-1, the data received from vehicle 210-1 can indicate that a driver of vehicle 210-1 has 28 years of driving experience, does not have any incident history (e.g., crashes, breakdowns, traffic violations, etc.), and that vehicle 210-1 is being used for recreational use. Additionally, or alternatively, and as another example, the information received from vehicle 210-2 can indicate that a driver of vehicle 210-2 has 10 years of driving experience, that the driver has a history of multiple incidents, and that vehicle 210-2 is being used for commercial purposes.

As shown by reference number 520, server device 230 can process information identifying metrics and/or factors related to vehicles 210-1 and 210-2 to determine a threshold rate at which vehicles 210-1 and 210-2 are to provide data to server device 230. For example, server device 230 can process the information received from vehicles 210-1 and 210-2 (e.g., shown by reference numbers 510-1 and 510-2 respectively). Continuing with the previous example, server device 230 can determine to reduce a rate at which vehicle 210-1 provides data (e.g., based on information received from vehicle 210-1 indicating that vehicle 210-1 is associated with a lower risk of being involved in a traffic incident relative to another vehicle 210 associated with a less experienced driver, a driver that has been involved in a higher quantity of traffic incidents, and/or the like as determined through machine learning, artificial intelligence, and/or the like). In this way, server device 230 conserves processing resources of vehicle 210-1 by reducing a threshold rate at which vehicle 210-1 provides data.

Conversely, and continuing still with the previous example, server device 230 can determine to increase a rate at which vehicle 210-2 provides data (e.g., based on information received from vehicle 210-2 indicating that vehicle 210-2 is associated with a higher risk of being involved in a traffic incident relative to another vehicle 210 associated with a more experienced driver, a driver that has been involved in fewer traffic incidents, a vehicle that is not being used for a commercial use, and/or the like as determined through use of machine learning, artificial intelligence, and/or the like).

Additionally, or alternatively, and continuing still with the previous example, server device 230 can determine to increase a rate at which vehicle 210-2 provides data based on determining that a speed of vehicle 210-2 exceeds a threshold, based on determining that a sensor associated with vehicle 210-2 has been activated, based on determining that vehicle 210-2 has been in use for a threshold amount of time, based on determining that vehicle 210-2 is moving without a driver (e.g., is being towed), and/or the like. Additionally, or alternatively, server device 230 can determine to increase a rate at which vehicle 210-2 provides data based on determining that vehicle 210-2 is moving at a time when a driver associated with vehicle 210-2 is scheduled for a break, based on a state of vehicle 210-2 (e.g., a towing state, an in-use state, etc.), based on input via client device 220 associated with vehicle 210-2 or mounted in vehicle 210-2, and/or the like.

Additionally, or alternatively, server device 230 can determine to increase a rate at which vehicle 210-2 provides data based on receiving particular information from an engine computer associated with vehicle 210-2, based on machine learning (e.g., where a result of the machine learning identifies a deviation of vehicle 210-2 from normal or historical behavior), based on a location of vehicle 210-2, and/or the like. Additionally, or alternatively, server device 230 may cause vehicle 210-2 to increase a rate based on a first client device 220 sending a message to a second client device 220 (e.g., where the second client device 220 is associated with a third party). In this way, server device 230 improves an accuracy of monitoring data from vehicle 210-2 by dynamically increasing a rate at which vehicle 210-2 provides data.

As shown by reference numbers 530-1 and 530-2, server device 230 can provide a set of instructions to vehicles 210-1 and 210-2 to cause vehicles 210-1 and 210-2 to provide data at the determined threshold rates. For example, and as shown by reference number 530-1, server device 230 can provide a set of instructions to vehicle 210-1 to cause vehicle 210-1 to provide data at a threshold rate of every 10 seconds for 300 seconds. Additionally, or alternatively, and as another example, and as shown by reference number 530-2, server device 230 can provide a set of instructions to vehicle 210-2 to cause vehicle 210-2 to provide data at a threshold rate of every three seconds for 300 seconds. In some implementations, server device 230 can process the data from vehicles 210-1 and 210-2 in a manner similar to that described elsewhere herein after receiving the data from vehicles 210-1 and 210-2.

In this way, server device 230 can dynamically and adaptively determine a threshold rate at which multiple vehicles 210 are to provide data to server device 230.

Although some implementations were described with respect to particular types of data, such as GPS data, the implementations described herein apply equally to other types of data, such as diagnostic data, telemetry data, and/or the like.

Some implementations, described herein, provide a device (e.g., a server device) that is capable of dynamically adjusting a rate at which a vehicle (e.g., a navigation system associated with the vehicle) provides data to the device. In this way, the device can dynamically modify a rate at which the vehicle provides data in different scenarios. This permits the device to control the rate at which the vehicle provides data to permit more accurate monitoring of the vehicle (e.g., by increasing a rate at which the vehicle provides the data), to conserve processing resources of the vehicle (e.g., by reducing a rate at which the vehicle provides the data), and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device, comprising:
one or more memories; and
one or more processors, communicatively coupled to the one or more memories, to:
  receive a transmission having an indication to cause a vehicle to provide data at an updated rate,
    the indication being received from:
      a second device associated with remotely monitoring the vehicle, or
      a third device in the vehicle,
    the updated rate being different than a current rate at which the data is being received;
  determine the updated rate at which the vehicle is to provide the data, the updated rate including at least one of:
    a frequency at which the data is to be provided, or
    an amount of time for which the data is to be provided;
  determine a set of instructions to be provided to the vehicle based on the indication;
  provide the set of instructions to the vehicle to cause the vehicle to provide the data at the updated rate;
  receive the data from the vehicle to permit or cause an action to be performed with respect to the data or the vehicle after providing the set of instructions to the vehicle,
    the data being received at the updated rate; and
  cause the action to be performed with respect to the data or the vehicle after receiving the data.

2. The first device of claim 1, where the data relates to:
a position of the vehicle,
a performance of the vehicle,
cargo of the vehicle, or
an environment of the vehicle.

3. The first device of claim 1, where the one or more processors, when receiving the indication, are to:
receive the indication based on a selection by a user of the second device or the third device.

4. The first device of claim 1, where the one or more processors are further to:
determine information related to:
  the vehicle,
  a driver of the vehicle, or
  a use of the vehicle; and
where the one or more processors, when receiving the indication, are to:
  receive the indication based on determining the information related to the vehicle, the driver, or the use.

5. The first device of claim 1, where the one or more processors are further to:
determine that a type of threshold metric or factor is satisfied using information related to the vehicle; and
where the one or more processors, when determining the updated rate, are to:
  determine the updated rate based on the type of threshold metric or factor that is satisfied.

6. The first device of claim 1, where the one or more processors are further to:
determine a type of data to be provided by the vehicle; and
where the one or more processors, when determining the set of instructions, are to:
  determine the set of instructions after determining the type of data to be provided by the vehicle,
    the set of instructions identifying the type of data to be provided.

7. The first device of claim 1, where the one or more processors, when performing the action, are to:
generate a report related to the data or the vehicle; and
cause the report to be provided for display via the second device or the third device.

8. A non-transitory computer-readable medium storing instructions, the instructions comprising:
one or more instructions that, when executed by one or more processors, cause the one or more processors to:
receive a transmission having an indication to cause a vehicle to provide data at an updated rate,
the indication being received from:
a first device associated with remotely monitoring the vehicle, or
a second device in the vehicle,
the updated rate being different than a current rate at which the data is being received;
determine the updated rate at which the vehicle is to provide the data,
the updated rate including at least one of:
a frequency at which the data is to be provided, or
an amount of time for which the data is to be provided;
determine a set of instructions to be provided to the vehicle based on the indication;
provide the set of instructions to the vehicle to cause the vehicle to provide the data at the updated rate;
receive the data from the vehicle to permit or cause an action to be performed with respect to the data or the vehicle after providing the set of instructions to the vehicle,
the data being received at the updated rate; and
cause the action to be performed with respect to the data or the vehicle after receiving the data.

9. The non-transitory computer-readable medium of claim 8, where the one or more instructions, when executed by the one or more processors, further cause the one or more processors to:
determine whether a threshold metric or factor is satisfied using information related to the vehicle; and
where the one or more instructions, that cause the one or more processors to receive the indication, cause the one or more processors to:
receive the indication based on determining whether the threshold metric or factor is satisfied.

10. The non-transitory computer-readable medium of claim 8, where the one or more instructions, when executed by the one or more processors, further cause the one or more processors to:
receive information identifying the updated rate from the first device; and
where the one or more instructions, that cause the one or more processors to determine the updated rate, cause the one or more processors to:
determine the updated rate using the information identifying the updated rate.

11. The non-transitory computer-readable medium of claim 8, where the one or more instructions, when executed by the one or more processors, further cause the one or more processors to:
determine a score for information related to the vehicle; and
where the one or more instructions, that cause the one or more processors to determine the updated rate, cause the one or more processors to:
determine the updated rate based on the score for the information related to the vehicle.

12. The non-transitory computer-readable medium of claim 8, where the one or more instructions, that cause the one or more processors to determine the set of instructions, cause the one or more processors to:
determine the set of instructions to cause the vehicle to reduce the current rate at which the vehicle is to provide the data.

13. The non-transitory computer-readable medium of claim 8, where the one or more instructions, that cause the one or more processors to determine the set of instructions, cause the one or more processors to:
determine the set of instructions to cause the vehicle to increase the current rate at which the vehicle is to provide the data.

14. The non-transitory computer-readable medium of claim 8, where the one or more instructions, when executed by the one or more processors, further cause the one or more processors to:
determine a particular type of data to be provided by the vehicle; and
where the one or more instructions, that cause the one or more processors to determine the set of instructions, cause the one or more processors to:
determine the set of instructions to cause the vehicle to provide the particular type of data.

15. A method, comprising:
receiving, by a first device, a transmission having an indication to cause a vehicle to provide data at an updated rate,
the indication being received from:
a second device associated with remotely monitoring the vehicle, or
a third device in the vehicle,
the updated rate being different than a current rate at which the data is being received;
determining, by the first device, the updated rate at which the vehicle is to provide the data,
the updated rate including at least one of:
a frequency at which the data is to be provided, or
an amount of time for which the data is to be provided;
determining, by the first device, a set of instructions to be provided to the vehicle based on the indication;
providing, by the first device, the set of instructions to the vehicle to cause the vehicle to provide the data at the updated rate;
receiving, by the first device, the data from the vehicle to permit or cause an action to be performed with respect to the data or the vehicle after providing the set of instructions to the vehicle,
the data being received at the updated rate; and
causing, by the first device, the action to be performed with respect to the data or the vehicle after receiving the data.

16. The method of claim 15, further comprising:
determining a type of indication that the first device received from the second device or the third device,
the type of indication including:
an emergency indication,
a lost indication, or
a tracking indication; and
where determining the updated rate comprises:
determining the updated rate based on the type of indication that the first device received from the second device or the third device.

17. The method of claim 15, further comprising:
determining a type of data to be provided by the vehicle, the type of data including:
  global positioning system (GPS) data,
  telemetry data, or
  diagnostic data; and
where determining the updated rate comprises:
  determining the updated rate based on the type of data to be provided by the vehicle.

18. The method of claim 15, further comprising:
determining whether a particular type of threshold metric or factor is satisfied using information related to the vehicle:
  the information related to the vehicle identifying:
    a quantity of years of experience of a driver of the vehicle,
    a use of the vehicle, or
    an incident history of the vehicle; and
  where determining the updated rate comprises:
    determining the updated rate based on determining whether the particular type of threshold metric or factor is satisfied.

19. The method of claim 15, where performing the action comprises:
  scheduling the vehicle for maintenance based on the data received from the vehicle.

20. The method of claim 15, where performing the action comprises:
  performing an analysis of the data after receiving the data; and
  causing a result of the analysis to be provided for display via the second device or the third device.

* * * * *